US012541298B2

United States Patent
Jung et al.

(10) Patent No.: US 12,541,298 B2
(45) Date of Patent: Feb. 3, 2026

(54) STORAGE DEVICE CONTROLLING GARBAGE COLLECTION OR WEAR LEVELING ON THE BASIS OF TIMESTAMP, AND METHOD THEREOF

(71) Applicant: SK hynix Inc., Icheon-si (KR)

(72) Inventors: Hoe Seung Jung, Icheon-si (KR); Joo Young Lee, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 128 days.

(21) Appl. No.: 18/159,686

(22) Filed: Jan. 26, 2023

(65) Prior Publication Data

US 2024/0143168 A1    May 2, 2024

(30) Foreign Application Priority Data

Oct. 28, 2022   (KR) .......................... 10-2022-0141068

(51) Int. Cl.
  *G06F 3/00*   (2006.01)
  *G06F 3/06*   (2006.01)
  *G06F 12/00*  (2006.01)

(52) U.S. Cl.
  CPC .......... *G06F 3/0604* (2013.01); *G06F 3/0616* (2013.01); *G06F 3/064* (2013.01); *G06F 3/0673* (2013.01)

(58) Field of Classification Search
  CPC ...... G06F 3/0604; G06F 3/0616; G06F 3/064; G06F 3/0673
  USPC ....................................................... 711/154
  See application file for complete search history.

(56) References Cited

U.S. PATENT DOCUMENTS

| | | | | |
|---|---|---|---|---|
| 5,987,374 A | * | 11/1999 | Akutsu | G08G 1/164 701/119 |
| 7,239,581 B2 | * | 7/2007 | Delgado | G06F 1/12 713/400 |
| 7,287,133 B2 | * | 10/2007 | Rowan | G06F 11/0751 711/155 |
| 7,296,008 B2 | * | 11/2007 | Passerini | G06F 11/1461 |
| 7,409,587 B2 | * | 8/2008 | Perry | G06F 11/1474 714/E11.131 |
| 7,577,807 B2 | * | 8/2009 | Rowan | G06F 11/1469 711/170 |
| 7,631,120 B2 | * | 12/2009 | Darcy | G06F 3/061 710/52 |
| 7,725,760 B2 | * | 5/2010 | Rowan | G06F 11/1435 700/32 |
| 7,730,222 B2 | * | 6/2010 | Passerini | G06F 3/0656 710/5 |
| 7,827,362 B2 | * | 11/2010 | Passerini | G06F 3/0659 710/54 |
| 7,904,428 B2 | * | 3/2011 | Perry | G06F 11/1469 707/677 |
| 8,350,577 B1 | * | 1/2013 | Ecker | G01R 35/005 324/601 |

(Continued)

FOREIGN PATENT DOCUMENTS

KR   10-2020-0064499 A   6/2020

*Primary Examiner* — Sheng Jen Tsai

(57) ABSTRACT

A storage device may get a timestamp when a timestamp getting condition is satisfied, may determine a retention time of a target super memory block according to time information calibrated on the basis of the timestamp, and may determine whether to select the target super memory block as a victim memory block for a target operation, on the basis of the determined retention time.

14 Claims, 10 Drawing Sheets

(56) References Cited

U.S. PATENT DOCUMENTS

| | | | |
|---|---|---|---|
| 10,157,677 B2* | 12/2018 | Marelli | G11C 16/26 |
| 11,106,577 B2* | 8/2021 | Muchherla | G06F 12/128 |
| 11,829,290 B2* | 11/2023 | Muchherla | G06F 12/0253 |
| 2003/0004661 A1* | 1/2003 | Burns | G01R 35/04 |
| | | | 702/62 |
| 2003/0028691 A1* | 2/2003 | Burkes | G06F 1/30 |
| | | | 710/15 |
| 2013/0007543 A1* | 1/2013 | Goss | G11C 16/349 |
| | | | 714/718 |
| 2013/0061019 A1* | 3/2013 | Fitzpatrick | G06F 11/3409 |
| | | | 711/173 |
| 2013/0295597 A1* | 11/2013 | DeWitte | G01N 35/026 |
| | | | 435/23 |
| 2014/0059405 A1* | 2/2014 | Syu | G11C 16/04 |
| | | | 711/E12.008 |
| 2014/0181620 A1* | 6/2014 | Kotzur | G06F 12/0246 |
| | | | 714/764 |
| 2015/0358234 A1* | 12/2015 | Krieger | H04W 8/005 |
| | | | 709/235 |
| 2016/0092304 A1* | 3/2016 | Tabrizi | G06F 11/1072 |
| | | | 714/704 |
| 2018/0300082 A1* | 10/2018 | Furlong | G06F 3/0688 |
| 2019/0018604 A1* | 1/2019 | Choi | G06F 3/064 |
| 2019/0079861 A1* | 3/2019 | Amaki | G11C 29/42 |
| 2019/0107959 A1* | 4/2019 | Papandreou | G06F 3/0619 |
| 2019/0146689 A1* | 5/2019 | Zhou | G11C 16/3418 |
| | | | 711/103 |
| 2019/0385057 A1* | 12/2019 | Litichever | H04L 63/14 |
| 2020/0133843 A1* | 4/2020 | Muchherla | G06F 12/0246 |
| 2020/0210330 A1* | 7/2020 | Muchherla | G06F 12/0238 |
| 2020/0242026 A1* | 7/2020 | Du | G06F 12/0253 |
| 2020/0264952 A1* | 8/2020 | Gherman | G06F 11/004 |
| 2021/0035627 A1* | 2/2021 | Tanpairoj | G11C 11/4076 |
| 2021/0042236 A1* | 2/2021 | Cariello | G06F 12/0246 |
| 2021/0405888 A1* | 12/2021 | Park | G06F 11/1048 |
| 2022/0171564 A1* | 6/2022 | Ryu | G06F 3/064 |
| 2022/0214826 A1* | 7/2022 | Seo | G06F 3/064 |
| 2022/0365707 A1* | 11/2022 | Kachare | G06F 3/0655 |
| 2022/0404968 A1* | 12/2022 | Zhou | G11C 16/26 |
| 2023/0029683 A1* | 2/2023 | Li | H04W 12/065 |
| 2023/0197115 A1* | 6/2023 | Cai | H04N 21/8547 |
| | | | 386/241 |
| 2024/0036764 A1* | 2/2024 | Zilberstein | G06F 16/1724 |

* cited by examiner

FIG.8
POLICY_1
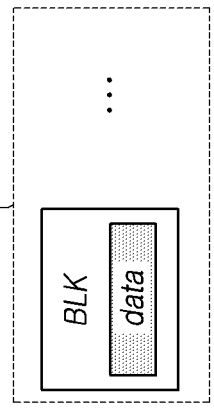
TGT_SBLK
(% of valid data) <= (RATE_1) :
TGT_SBLK is victim block
(% of valid data) > (RATE_1) :
TGT_SBLK is not victim block
POLICY_2
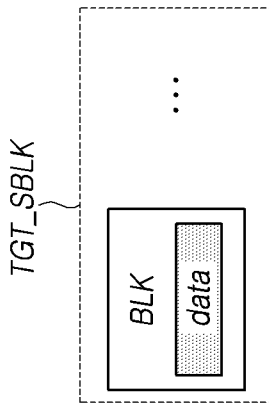
TGT_SBLK
(% of valid data) <= (RATE_2) :
TGT_SBLK is victim block
(% of valid data) > (RATE_2) :
TGT_SBLK is not victim block
(RATE_1) > (RATE_2)

STORAGE DEVICE CONTROLLING GARBAGE COLLECTION OR WEAR LEVELING ON THE BASIS OF TIMESTAMP, AND METHOD THEREOF

CROSS-REFERENCE TO RELATED APPLICATION

The present application claims priority under 35 U.S.C. § 119(a) to Korean Patent Application No. 10-2022-0141068 filed in the Korean Intellectual Property Office on Oct. 28, 2022, which is incorporated herein by reference in its entirety.

BACKGROUND

1. Technical Field

Various embodiments generally relate to a storage device that controls garbage collection or wear leveling operations on the basis of a timestamp, and a method thereof.

2. Related Art

A storage device is a device that stores data on the basis of a request of an external device such as a computer, a mobile terminal such as a smartphone or a tablet, or various other electronic devices.

The storage device may include a controller for controlling a memory (e.g., a volatile memory or a nonvolatile memory). The controller may receive a command from the external device, and may execute or control an operation for reading, writing or erasing data with respect to the memory included in the storage device, on the basis of the received command.

The storage device may receive attribute information (e.g., hot/cold/warm) from the external device for data stored in the memory. However, the accuracy of the attribute information of the data received from the external device may deteriorate over time.

SUMMARY

Various embodiments are directed to a storage device capable of improving the write performance of the storage device and increasing the lifetime of the storage device, and a method thereof.

In an embodiment, a storage device may include: i) a memory including a plurality of memory blocks; and ii) a controller configured to receive a timestamp from an external device when a set timestamp getting condition is satisfied, determine a retention time of a target super memory block including at least one among the plurality of memory blocks on the basis of the timestamp, when a set target operation is triggered, and determine whether to select the target super memory block as a victim memory block for the target operation, on the basis of the retention time of the target super memory block.

In an embodiment, a method for operating a storage device may include: i) getting a timestamp from an external device, in a state in which a set timestamp getting condition is satisfied; ii) determining a retention time of a target super memory block including at least one among a plurality of memory blocks on the basis of the timestamp, when a target operation is triggered; and iii) determining whether to select the target super memory block as a victim memory block for the target operation, on the basis of the retention time of the target super memory block.

In an embodiment, a controller may include: i) a memory interface capable of communicating with a memory including a plurality of memory blocks; and ii) a control circuit configured to calibrate time information on the basis of a timestamp received from an external device, to determine a retention time of a target super memory block including at least one among the plurality of memory blocks according to the calibrated time information, when a target operation is triggered, and to select the target super memory block as a victim memory block for the target operation, according to the retention time of the target super memory block.

According to the embodiments of the disclosed technology, it is possible to improve the write performance of a storage device and increase the lifetime of the storage device.

BRIEF DESCRIPTION OF THE DRAWINGS

FIG. 8 is a diagram illustrating an example of an operation in which a storage device determines a victim memory block of a target operation, according to an embodiment of the disclosure.

DETAILED DESCRIPTION

Figure 1:
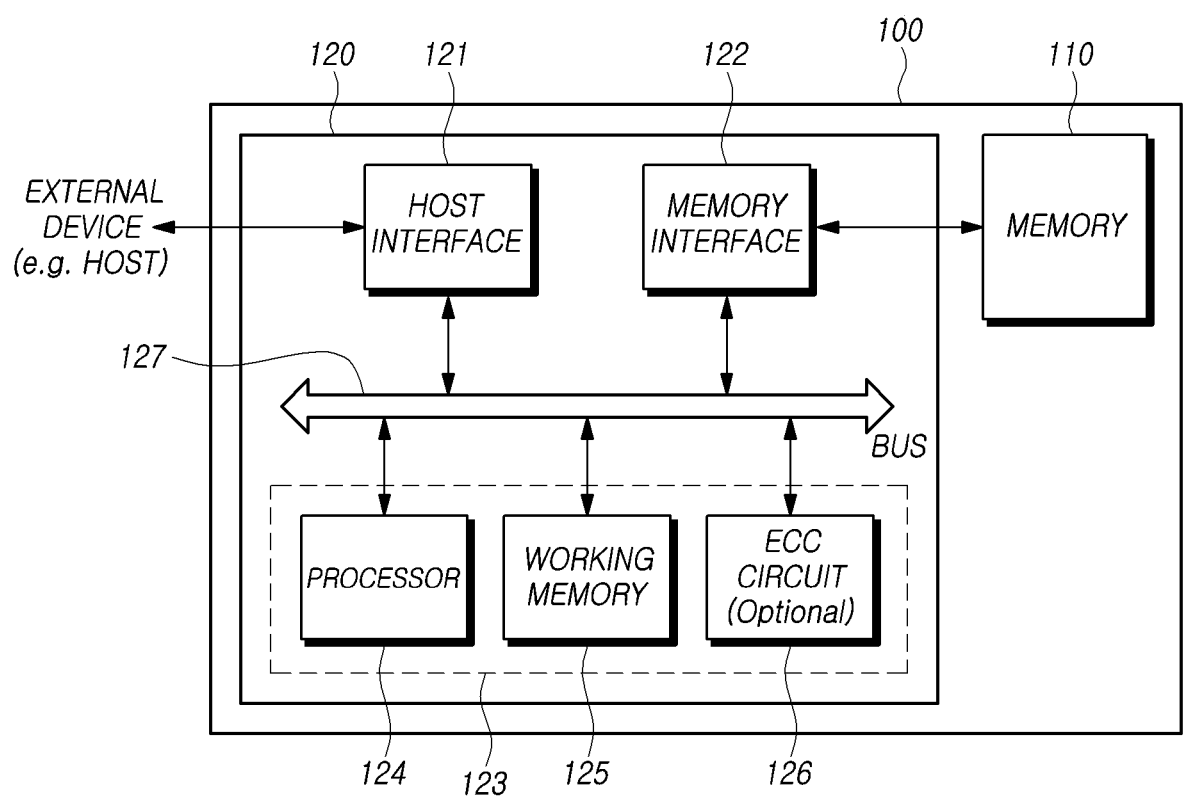
FIG. 1 is a schematic configuration diagram of a storage device according to an embodiment of the disclosure.

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily limited to the same embodiment(s). The term "embodiments" when used herein does not necessarily refer to all embodiments.

Various embodiments of the present invention are described below in more detail with reference to the accompanying drawings. However, the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 is a schematic configuration diagram of a storage device according to an embodiment of the disclosure.

Referring to FIG. 1, a storage device 100 may include a memory 110 that stores data, and a controller 120 that controls the memory 110.

The memory 110 includes a plurality of memory blocks, and operates in response to the control of the controller 120. Operations of the memory 110 may include, for example, a read operation, a program operation (also referred to as a write operation) and an erase operation.

The memory 110 may include a memory cell array including a plurality of memory cells (also simply referred to as "cells"), which store data. Such a memory cell array may exist in a memory block.

For example, the memory 110 may be implemented into various types of memory such as a NAND flash memory, a 3D NAND flash memory, a NOR flash memory, a resistive random access memory (RRAM), a phase-change random access memory (PRAM), a magnetoresistive random access memory (MRAM), a ferroelectric random access memory (FRAM) and a spin transfer torque random access memory (STT-RAM).

The memory 110 may be implemented as a three-dimensional array structure. For example, embodiments of the disclosure may be applied to a charge trap flash (CTF) in which a charge storage layer is configured by a dielectric layer and a flash memory in which a charge storage layer is configured by a conductive floating gate.

The memory 110 may receive a command and an address from the controller 120 and may access an area that is selected by the address in the memory cell array. In other words, the memory 110 may perform an operation indicated by the command, on the area selected by the address.

The memory 110 may perform a program operation, a read operation or an erase operation. For example, when performing the program operation, the memory 110 may program data to the area selected by the address. When performing the read operation, the memory 110 may read data from the area selected by the address. In the erase operation, the memory 110 may erase data stored in the area selected by the address.

The controller 120 may control write (program), read, erase and background operations for the memory 110. For example, background operations may include at least one from among a garbage collection (GC) operation, a wear leveling (WL) operation, a read reclaim (RR) operation, a bad block management (BBM) operation, and so forth.

The controller 120 may control the operation of the memory 110 according to a request from a device (e.g., a host) located outside the storage device 100. The controller 120, however, may control the operation of the memory 110 regardless or in the absence of a request of the host.

The host may be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, an RFID (radio frequency identification) device, a mobility device (e.g., a vehicle, a robot or a drone) capable of traveling under human control or autonomous driving, etc.

The host may include at least one operating system (OS). The operating system may generally manage and control the function and operation of the host, and may provide interoperability between the host and the storage device 100. The operating system may be classified into a general operating system and a mobile operating system depending on the mobility of the host.

The controller 120 and the host may be devices that are separated from each other or the controller 120 and the host may be implemented by being integrated into one device. Hereafter, for the sake of convenience in explanation, embodiments will be described with the controller 120 and the host separated from each other.

Referring to FIG. 1, the controller 120 may include a memory interface 122 and a control circuit 123, and may further include a host interface 121.

The host interface 121 provides an interface for communication with the host. For example, the host interface 121 provides an interface that uses at least one among various interface protocols such as a USB (universal serial bus) protocol, an MMC (multimedia card) protocol, a PCI (peripheral component interconnection) protocol, a PCI-E (PCI-express) protocol, an ATA (advanced technology attachment) protocol, a serial-ATA protocol, a parallel-ATA protocol, an SCSI (small computer system interface) protocol, an ESDI (enhanced small disk interface) protocol, an SMBus (system management bus) protocol, an I2C (inter-integrated circuit) protocol, an I3C (improved inter-integrated circuit) protocol, an IDE (integrated drive electronics) protocol and a private protocol.

When receiving a command from the host, the control circuit 123 may receive the command through the host interface 121, and may perform an operation of processing the received command.

The memory interface 122 may be coupled with the memory 110 to provide an interface for communication with the memory 110. That is to say, the memory interface 122 may be configured to provide an interface between the memory 110 and the controller 120 in response to the control of the control circuit 123.

The control circuit 123 performs the general control operations of the controller 120 to control the operation of the memory 110. To this end, for instance, the control circuit 123 may include at least one of a processor 124 and a working memory 125, and may optionally include an error detection and correction circuit (ECC circuit) 126.

The processor 124 may control general operations of the controller 120, and may perform a logic calculation. The processor 124 may communicate with the host through the host interface 121, and may communicate with the memory 110 through the memory interface 122.

The processor 124 may perform the function of a flash translation layer (FTL). The processor 124 may translate a logical block address (LBA), provided by the host, into a physical block address (PBA) through the flash translation layer (FTL). The flash translation layer (FTL) may receive the logical block address (LBA) and translate the logical block address (LBA) into the physical block address (PBA), by using a mapping table.

There are various address mapping methods of the flash translation layer, depending on a mapping unit. Representative address mapping methods include a page mapping method, a block mapping method and a hybrid mapping method.

The processor 124 may randomize data received from the host. For example, the processor 124 may randomize data received from the host by using a set randomizing seed. The randomized data may be provided to the memory 110, and may be programmed to a memory cell array of the memory 110.

In a read operation, the processor 124 may derandomize data received from the memory 110. For example, the processor 124 may derandomize data received from the memory 110 by using a derandomizing seed. The derandomized data may be outputted to the host.

The processor 124 may execute firmware to control the operation of the controller 120. Namely, in order to control the general operation of the controller 120 and perform a logic calculation, the processor 124 may execute (drive) firmware loaded in the working memory 125 upon booting. Hereafter, embodiments of an operation of the storage device 100 will be described as implemented in such a way that the processor 124 executes firmware in which the corresponding operation is defined.

Firmware, as a program to be executed in the storage device 100 to drive the storage device 100, may include various functional layers. For example, the firmware may include binary data in which codes for executing the functional layers, respectively, are defined.

For example, the firmware may include at least one from among a flash translation layer (FTL), which performs a translating function between a logical address requested to the storage device 100 from the host and a physical address of the memory 110; a host interface layer (HIL) which serves to analyze a command requested to the storage device 100 as a storage device from the host and transfer the command to the flash translation layer (FTL); and a flash interface layer (FIL), which transfers a command, instructed from the flash translation layer (FTL), to the memory 110.

Such firmware may be loaded in the working memory 125 from, for example, the memory 110 or a separate nonvolatile memory (e.g., a ROM or a NOR Flash) located outside the memory 110. The processor 124 may first load all or a part of the firmware in the working memory 125 when executing a booting operation after power-on.

The processor 124 may perform a logic calculation, which is defined in the firmware loaded in the working memory 125, to control the general operation of the controller 120. The processor 124 may store a result of performing the logic calculation defined in the firmware, in the working memory 125. The processor 124 may control the controller 120 according to a result of performing the logic calculation defined in the firmware such that the controller 120 generates a command or a signal. When a part of firmware, in which a logic calculation to be performed is defined, is stored in the memory 110 but is not loaded in the working memory 125, the processor 124 may generate an event (e.g., an interrupt) for loading the corresponding part of the firmware into the working memory 125 from the memory 110.

The processor 124 may load metadata necessary for driving firmware, from the memory 110. The metadata, as data for managing the memory 110, may include management information on user data stored in the memory 110.

Firmware may be updated while the storage device 100 is manufactured or while the storage device 100 is executed. The controller 120 may download new firmware from the outside of the storage device 100 and update existing firmware with the new firmware.

The working memory 125 may store firmware, a program code, a command and data that are necessary to drive the controller 120. A working memory 125 may be, for example, a volatile memory that includes at least one among an SRAM (static RAM), a DRAM (dynamic RAM) and an SDRAM (synchronous DRAM).

The error detection and correction circuit 126 may detect an error bit of target data and correct the detected error bit by using an error correction code. The target data may be, for example, data stored in the working memory 125 or data read from the memory 110.

The error detection and correction circuit 126 may be implemented to decode data by using an error correction code. The error detection and correction circuit 126 may be implemented by various code decoders. For example, a decoder that performs unsystematic code decoding or a decoder that performs systematic code decoding may be used.

For example, the error detection and correction circuit 126 may detect an error bit by the unit of a set sector in each of read data. Each read data may be constituted by a plurality of sectors. A sector may mean a data unit that is smaller than a page, which is the read unit of a flash memory. Sectors constituting each read data may be matched with one another using an address.

The error detection and correction circuit 126 may calculate a bit error rate (BER), and may determine whether an error is correctable or not by units of sectors. For example, when a bit error rate (BER) is higher than a set reference value, the error detection and correction circuit 126 may determine that a corresponding sector is uncorrectable or a fail. On the other hand, when a bit error rate (BER) is lower than the reference value, the error detection and correction circuit 126 may determine that a corresponding sector is correctable or a pass.

The error detection and correction circuit 126 may perform an error detection and correction operation sequentially for all read data. In the case where a sector included in read data is correctable, the error detection and correction circuit 126 may omit an error detection and correction operation for a corresponding sector for next read data. If the error detection and correction operation for all read data is ended in this way, then the error detection and correction circuit 126 may detect an uncorrectable sector. There may be one or more sectors that are determined to be uncorrectable. The error detection and correction circuit 126 may transfer information (for example, address information) regarding a sector which is determined to be uncorrectable, to the processor 124.

A bus 127 may be configured to provide channels among the components 121, 122, 124, 125 and 126 of the controller 120. The bus 127 may include, for example, a control bus for transferring various control signals, commands and the like, a data bus for transferring various data, and so forth.

Some of the components among the above-described components 121, 122, 124, 125 and 126 of the controller 120 may be omitted, or some of the components among the above-described components 121, 122, 124, 125 and 126 of the controller 120 may be integrated into one component. In other embodiments, one or more other components may be added in addition to the above-described components 121, 122, 124, 125 and 126 of the controller 120.

Hereinbelow, the memory 110 will be described in further detail with reference to FIG. 2.

Figure 2:
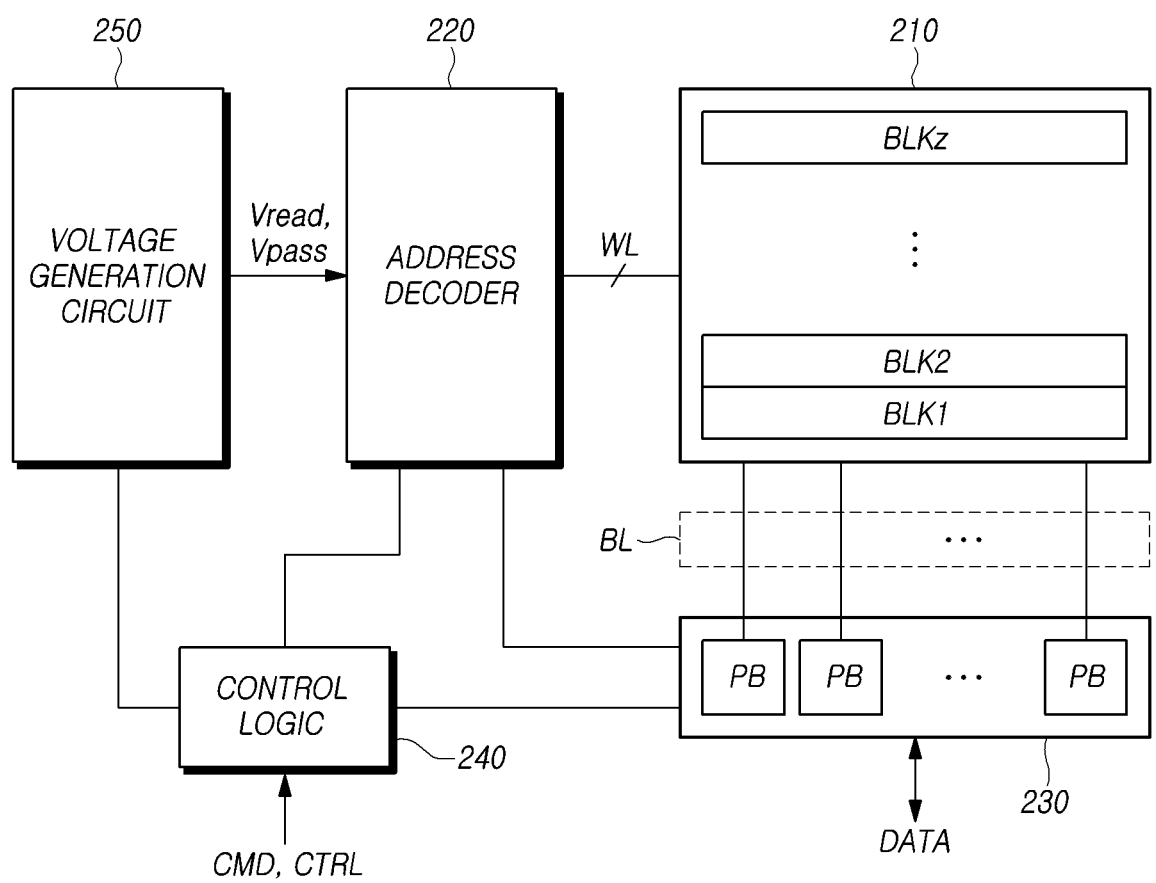
FIG. 2 is a block diagram schematically illustrating a memory of FIG. 1.

FIG. 2 is a diagram schematically illustrating a memory of FIG. 1.

Referring to FIG. 2, a memory 110 may include a memory cell array 210, an address decoder 220, a read and write circuit 230, a control logic 240, and a voltage generation circuit 250.

The memory cell array 210 may include a plurality of memory blocks BLK1 to BLKz (where z is a natural number of 2 or greater).

In the plurality of memory blocks BLK1 to BLKz, a plurality of word lines WL and a plurality of bit lines BL may be disposed, and a plurality of memory cells (MC) may be arranged.

The plurality of memory blocks BLK1 to BLKz may be coupled with the address decoder 220 through the plurality of word lines WL. The plurality of memory blocks BLK1 to BLKz may be coupled with the read and write circuit 230 through the plurality of bit lines BL.

Each of the plurality of memory blocks BLK1 to BLKz may include a plurality of memory cells. For example, the plurality of memory cells may be nonvolatile memory cells, and may be configured by nonvolatile memory cells that have vertical channel structures.

The memory cell array 210 may be configured by a memory cell array of a two-dimensional structure or may be configured by a memory cell array of a three-dimensional structure.

Each of the plurality of memory cells included in the memory cell array 210 may store at least 1-bit data. For instance, each of the plurality of memory cells included in the memory cell array 210 may be a signal level cell (SLC) that stores 1-bit data. In another instance, each of the plurality of memory cells included in the memory cell array 210 may be a multi-level cell (MLC) that stores 2-bit data. In still another instance, each of the plurality of memory cells included in the memory cell array 210 may be a triple level cell (TLC) that stores 3-bit data. In yet another instance, each of the plurality of memory cells included in the memory cell array 210 may be a quad level cell (QLC) that stores 4-bit data. In a further instance, the memory cell array 210 may include a plurality of memory cells, each of which stores 5 or more-bit data.

The number of bits of data stored in each of the plurality of memory cells may be dynamically determined. For example, a single-level cell that stores 1-bit data may be changed to a triple-level cell that stores 3-bit data.

Referring to FIG. 2, the address decoder 220, the read and writhe circuit 230, the control logic 240 and the voltage generation circuit 250 may operate as a peripheral circuit that drives the memory cell array 210.

The address decoder 220 may be coupled to the memory cell array 210 through the plurality of word lines WL.

The address decoder 220 may be configured to operate in response to the control of the control logic 240.

The address decoder 220 may receive an address through an input/output buffer in the memory 110. The address decoder 220 may be configured to decode a block address in the received address. The address decoder 220 may select at least one memory block depending on the decoded block address.

The address decoder 220 may receive a read voltage Vread and a pass voltage Vpass from the voltage generation circuit 250.

During a read operation, the address decoder 220 may apply the read voltage Vread to a selected word line WL in a selected memory block in a read voltage applying operation. The address decoder 220 may apply the pass voltage Vpass to the remaining unselected word lines WL.

The address decoder 220 may apply a verify voltage generated in the voltage generation circuit 250 to a selected word line WL in a selected memory block in a program verify operation, and may apply the pass voltage Vpass to the remaining unselected word lines WL.

The address decoder 220 may be configured to decode a column address in the received address. The address decoder 220 may transmit the decoded column address to the read and write circuit 230.

A read operation and a program operation of the memory 110 may be performed by the unit of a page. An address received when a read operation or a program operation is requested may include at least one from among a block address, a row address and a column address.

The address decoder 220 may select one memory block and one word line depending on a block address and a row address. A column address may be decoded by the address decoder 220 and be provided to the read and write circuit 230.

The address decoder 220 may include at least one from among a block decoder, a row decoder, a column decoder and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 described above may also be referred to as a page buffer circuit or a data register circuit that includes a plurality of page buffers PB. The read and write circuit 230 may include data buffers that take charge of a data processing function, and may further include cache buffers that take charge of a caching function.

The plurality of page buffers PB may be coupled to the memory cell array 210 through the plurality of bit lines BL. The plurality of page buffers PB may continuously supply sensing current to bit lines BL coupled with memory cells to sense threshold voltages (Vth) of the memory cells in a read operation and a program verify operation, and may latch sensing data by sensing, through sensing nodes, changes in the amounts of current flowing depending on the programmed states of the corresponding memory cells.

The read and write circuit 230 may operate in response to page buffer control signals outputted from the control logic 240.

In a read operation, the read and write circuit 230 temporarily stores read data by sensing data of memory cells, and then, outputs data DATA to the input/output buffer of the memory 110. As an exemplary embodiment, the read and write circuit 230 may include a column select circuit in addition to the page buffers PB or the page registers.

The control logic 240 may be coupled with the address decoder 220, the read and write circuit 230 and the voltage generation circuit 250. The control logic 240 may receive a command CMD and a control signal CTRL through the input/output buffer of the memory 110.

The control logic 240 may be configured to control general operations of the memory 110 in response to the control signal CTRL. The control logic 240 may output control signals for adjusting the precharge potential levels of the sensing nodes of the plurality of page buffers PB.

The control logic 240 may control the read and write circuit 230 to perform a read operation of the memory cell array 210. The voltage generation circuit 250 may generate the read voltage Vread and the pass voltage Vpass used in a read operation, in response to a voltage generation circuit control signal outputted from the control logic 240.

Each memory block of the memory 110 described above may be configured by a plurality of pages corresponding to a plurality of word lines WL and a plurality of strings corresponding to a plurality of bit lines BL.

In a memory block BLK, a plurality of word lines WL and a plurality of bit lines BL may be disposed to intersect with each other. For example, each of the plurality of word lines WL may be disposed in a row direction, and each of the plurality of bit lines BL may be disposed in a column direction. For another example, each of the plurality of word lines WL may be disposed in a column direction, and each of the plurality of bit lines BL may be disposed in a row direction.

A memory cell may be coupled to one of the plurality of word lines WL and one of the plurality of bit lines BL. A transistor may be disposed in each memory cell.

For example, a transistor disposed in each memory cell (MC) may include a drain, a source and a gate. The drain (or source) of the transistor may be coupled with a corresponding bit line BL directly or via another transistor. The source (or drain) of the transistor may be coupled with a source line (which may be the ground) directly or via another transistor. The gate of the transistor may include a floating gate, which is surrounded by a dielectric, and a control gate to which a gate voltage is applied from a word line WL.

In each memory block, a first select line (also referred to as a source select line or a drain select line) may be additionally disposed outside a first outermost word line more adjacent to the read and write circuit 230 between two outermost word lines, and a second select line (also referred to as a drain select line or a source select line) may be additionally disposed outside a second outermost word line between the two outermost word lines.

At least one dummy word line may be additionally disposed between the first outermost word line and the first select line. At least one dummy word line may also be additionally disposed between the second outermost word line and the second select line.

A read operation and a program operation (write operation) of the memory block described above may be performed by the unit of a page, and an erase operation may be performed by the unit of a memory block.

Figure 3:
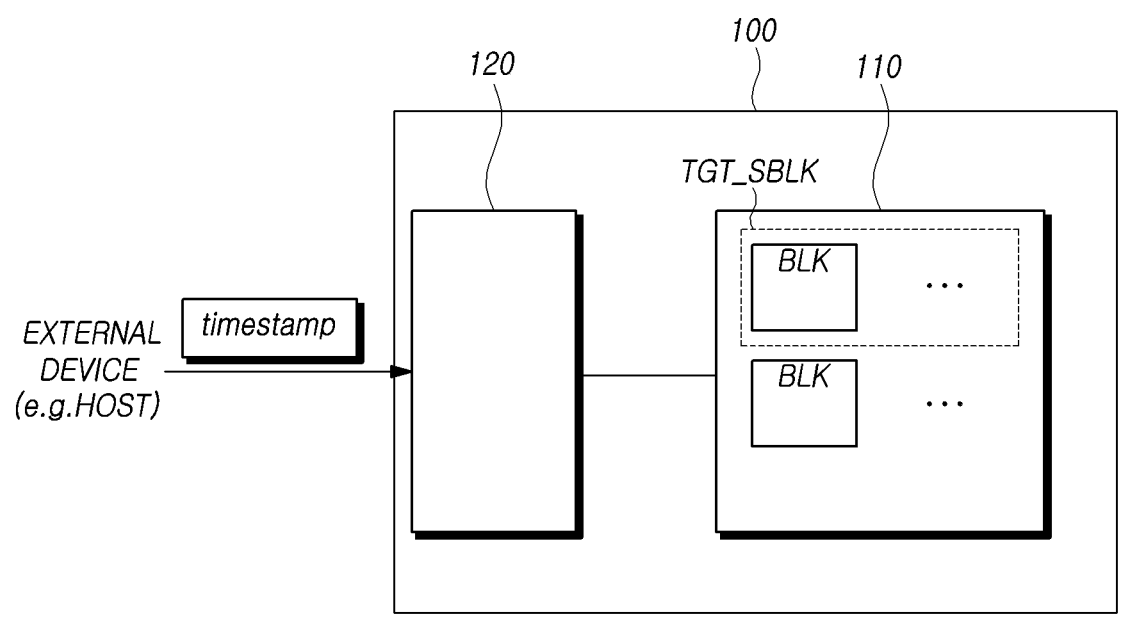
FIG. 3 is a diagram illustrating a structure of a storage device according to an embodiment of the disclosure.

FIG. 3 is a diagram illustrating a structure of a storage device according to an embodiment of the disclosure.

Referring to FIG. 3, a storage device 100 may include a memory 110 and a controller 120.

The memory 110 may include a plurality of memory blocks BLK.

The controller 120 may get a timestamp from an external device (e.g., a host) located outside the storage device 100. In an embodiment, the controller 120 may get the timestamp from the external device when a specific condition is satisfied.

The timestamp may indicate information about time. The controller 120 may use a timer for internally measuring time, but the accuracy of the timer may decrease over time. For example, when the storage device 100 is powered off, the duration of the power-off state may not be accurately reflected in the timer.

Accordingly, the controller 120 may increase the accuracy of the timer by calibrating the timer on the basis of a timestamp received from the external device.

The format of the timestamp may be implemented in various ways. For example, the timestamp may be a virtual time stamp or a real time stamp.

The controller 120 may set a target super memory block TGT_SBLK including one or more of the plurality of memory blocks BLK included in the memory 110.

The controller 120 may set one or more super memory blocks in the memory 110. Each of the super memory blocks may include one or more of the plurality of memory blocks BLK, and the controller 120 may execute a read, write or erase operation on the super memory block. The controller 120 may set one of the super memory blocks as the target super memory block TGT_SBLK.

In an embodiment, the controller 120 of the storage device 100 may determine the retention time of the target super memory block TGT_SBLK according to time information calibrated using the aforementioned timestamp.

The retention time of the target super memory block TGT_SBLK is the duration in which data is stored in the target super memory block TGT_SBLK, and may be used by the controller 120 to determine attributes (e.g., hot/cold/warm) of the data stored in the target super memory block TGT_SBLK.

Based on the determined retention time, the controller 120 may determine whether to select the target super memory block TGT_SBLK as a victim memory block for a target operation.

The target operation may be garbage collection or wear leveling. When the target super memory block TGT_SBLK is selected as a victim memory block for a target operation, the data stored in the target super memory block TGT_SBLK may be migrated to another super memory block.

Hereinafter, this operation will be described in detail with reference to FIG. 4.

Figure 4:
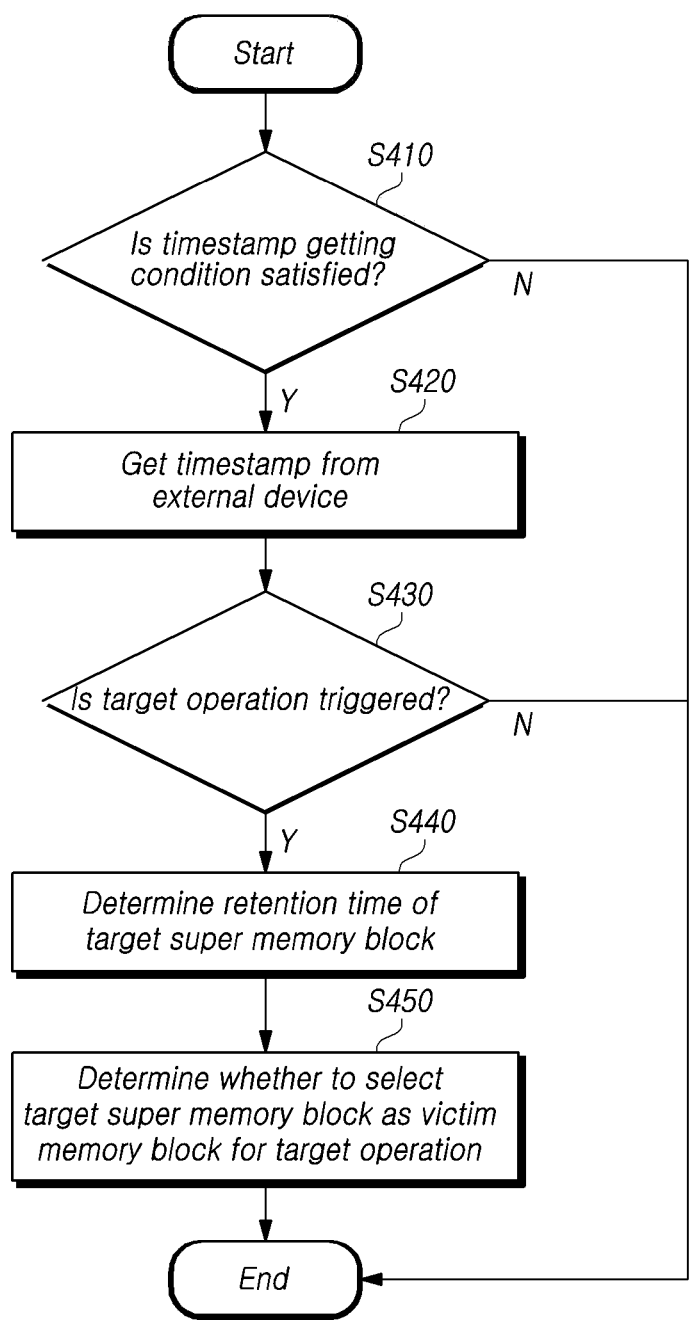
FIG. 4 is a flowchart illustrating an example of an operation of a storage device according to an embodiment of the disclosure.

FIG. 4 is a flowchart illustrating an example of an operation of a storage device according to an embodiment of the disclosure.

A controller 120 of a storage device 100 determines whether conditions are satisfied for receiving a timestamp (S410).

When the timestamp getting condition is satisfied (S410-Y), the controller 120 may get a timestamp from an external device (S420). On the other hand, when the timestamp getting condition is not satisfied (S410-N), the controller 120 may end an operation of determining whether to select the target super memory block TGT_SBLK as a victim memory block for a target operation.

In other embodiments, when the timestamp getting condition is not satisfied, the controller 120 repeat the step of determining whether conditions are satisfied for receiving a timestamp after a predetermined period of time.

After the step S420, the controller 120 determines whether a target operation is triggered (S430), which means that an execution condition of the target operation is satisfied or the execution of the target operation is started.

For example, when the number of free memory blocks among the memory blocks BLK included in the memory 110 is less than a threshold number, garbage collection may be triggered. Garbage collection may be triggered when the storage device 100 is in an idle state.

In another example, when an erase count of a certain memory block included in the memory 110 is equal to or greater than a threshold erase count, wear leveling may be triggered.

When the target operation is triggered (S430-Y), the controller 120 may determine the retention time of the target super memory block TGT_SBLK (S440). The controller 120 may determine whether to select the target super memory block TGT_SBLK as a victim memory block for the target operation using the retention time of the target super memory block TGT_SBLK, which is determined at the step S440 (S450).

On the other hand, when the target operation is not triggered (S430-N), the controller 120 may end an operation of determining whether to select the target super memory block TGT_SBLK as a victim memory block for a target operation.

Figure 5:
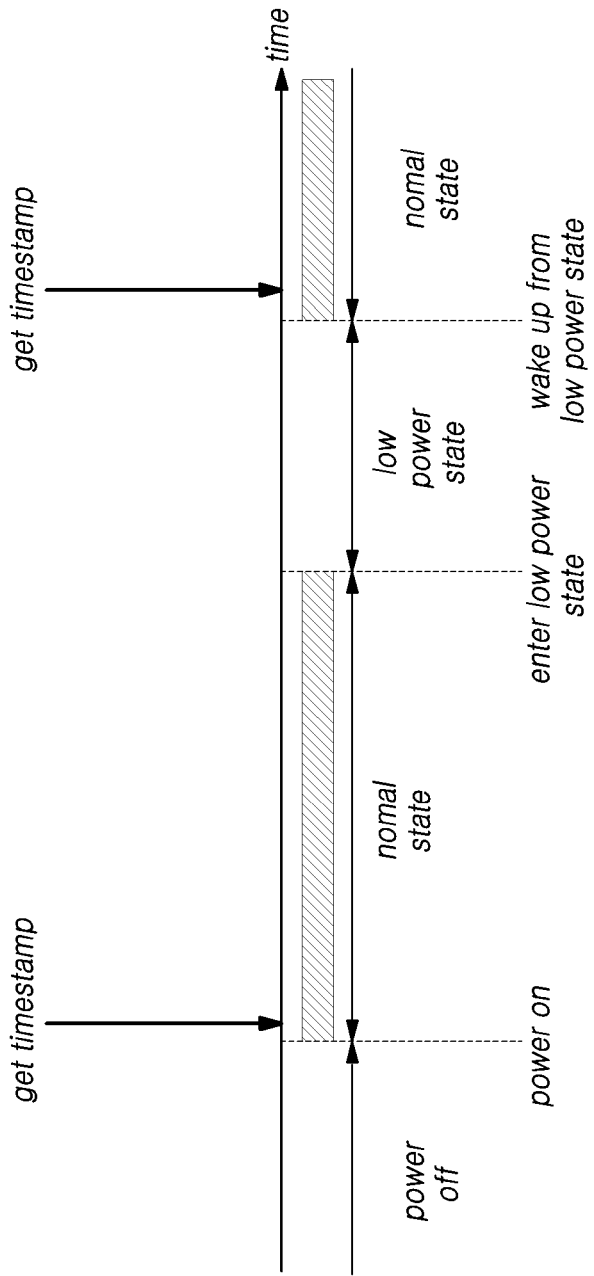
FIG. 5 is a diagram illustrating an example of a time point at which a storage device gets a timestamp, according to an embodiment of the disclosure.

FIG. 5 is a diagram illustrating an example of a time point when a storage device gets a timestamp, according to an embodiment of the disclosure.

Referring to FIG. 5, a timestamp getting condition may be satisfied when a storage device 100 is powered on. Accordingly, the storage device 100 may get a timestamp from an external device immediately after being powered on.

When the storage device 100 is powered on, the storage device 100 may enter a normal state from a power off state. In the normal state, the storage device 100 may execute operations (e.g., read/write/erase operations) requested by the external device.

Also, the timestamp getting condition may be satisfied when the storage device 100 wakes up from a low power state. Accordingly, the storage device 100 may get a timestamp from the external device immediately after waking up from the low power state.

The low power state may be a state in which performance is limited in exchange for consuming less power as compared to a normal state.

The storage device 100 may enter the low power state from the normal state. Thereafter, the storage device 100 may wake up from the low power state and operate in a normal state again. For example, the storage device 100 may wake up from a low power state when hibernation is ended, or when a start stop unit (SSU) is activated.

In a hibernation state, the storage device 100 may only be able to use a limited amount of supplied power. Accordingly, the storage device 100 may stop or delay some operations in the hibernation state. After hibernation is ended, the storage device 100 may execute the stopped or delayed operations. The storage device 100 may receive a command instructing start or end of hibernation from the external device.

The SSU is defined in UFS (Universal Flash Storage) SCSI to control the power of the storage device 100. When the SSU is activated, the storage device 100 may wake up from a low power state and use power in the same manner as in a normal state. The storage device 100 may receive a command from the external device instructing activation of the SSU.

Figure 6:
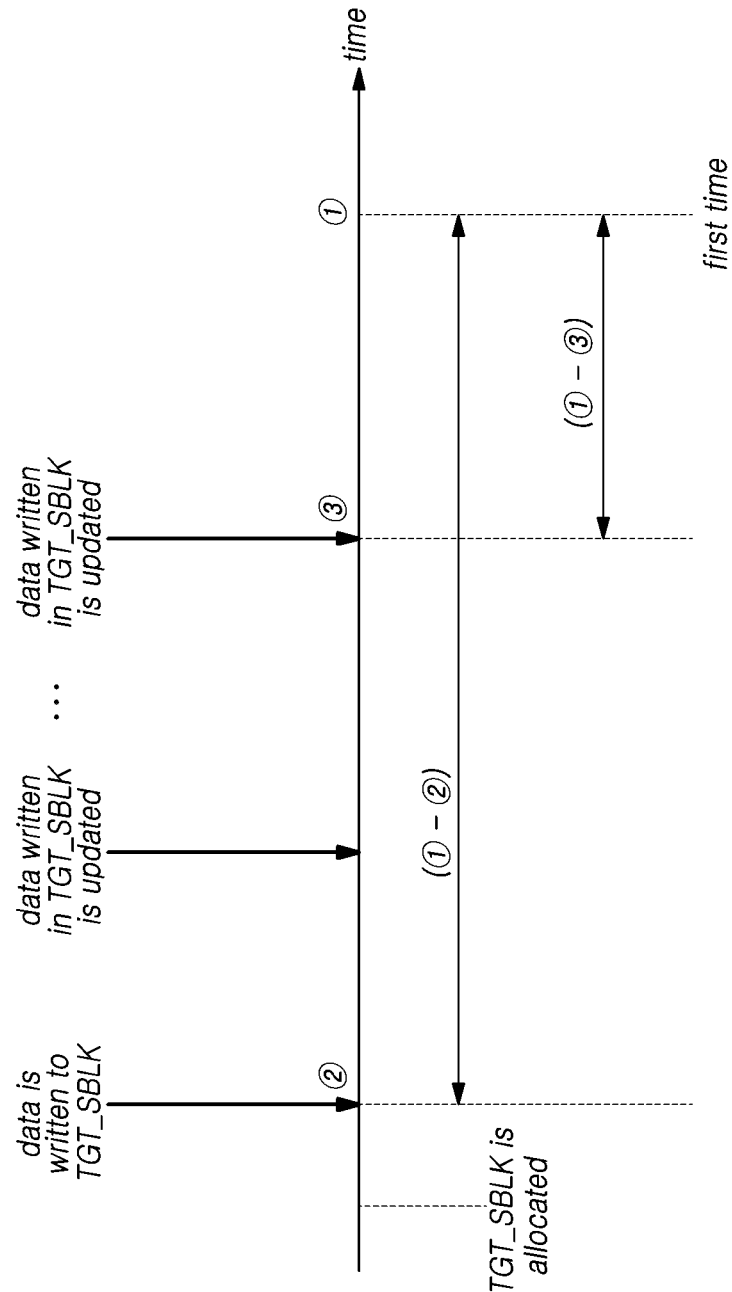
FIG. 6 is a diagram illustrating an example of an operation in which a storage device determines a retention time, according to an embodiment of the disclosure.

FIG. 6 is a diagram illustrating an example of an operation in which a storage device determines a retention time, according to an embodiment of the disclosure.

Referring to FIG. 6, a controller 120 of a storage device 100 may determine a retention time of a target super memory block TGT_SBLK based on the difference between a first time point and a second time point for the target super memory block TGT_SBLK.

In FIG. 6, the first time point ① may be an arbitrary time point. For example, the controller 120 may determine a current time point as the first time point ①. In another example, the controller 120 may determine a time point at which a target operation is triggered, as the first time point ①.

The first time point ① may be calculated according to time information calibrated using a timestamp received by the controller 120 from the external device. As described above, the controller 120 may calibrate internally managed time information using the timestamp from the external device, and may calculate the first time point ① according to the calibrated time information.

For example, the second time point may be a time point ② at which all or a part of data stored in the target super memory block TGT_SBLK is first written. The all or the part of the data stored in the target super memory block TGT_SBLK is retained in the target super memory block TGT_SBLK from the second time point ②, at which it is first written, to the first time point ①. In this case, the retention time of the target super memory block TGT_SBLK is ①-②.

In another example, the second time point may be a time point ③ at which all or a part of data stored in the target super memory block TGT_SBLK is recently updated. The data stored in the target super memory block TGT_SBLK may be updated over time, and the all or the part of the data stored in the target super memory block TGT_SBLK may be retained in the target super memory block TGT_SBLK from the time point ③, at which it is recently updated, to the first time point ①. In this case, the retention time of the target super memory block TGT_SBLK is ①-③.

Figure 7:
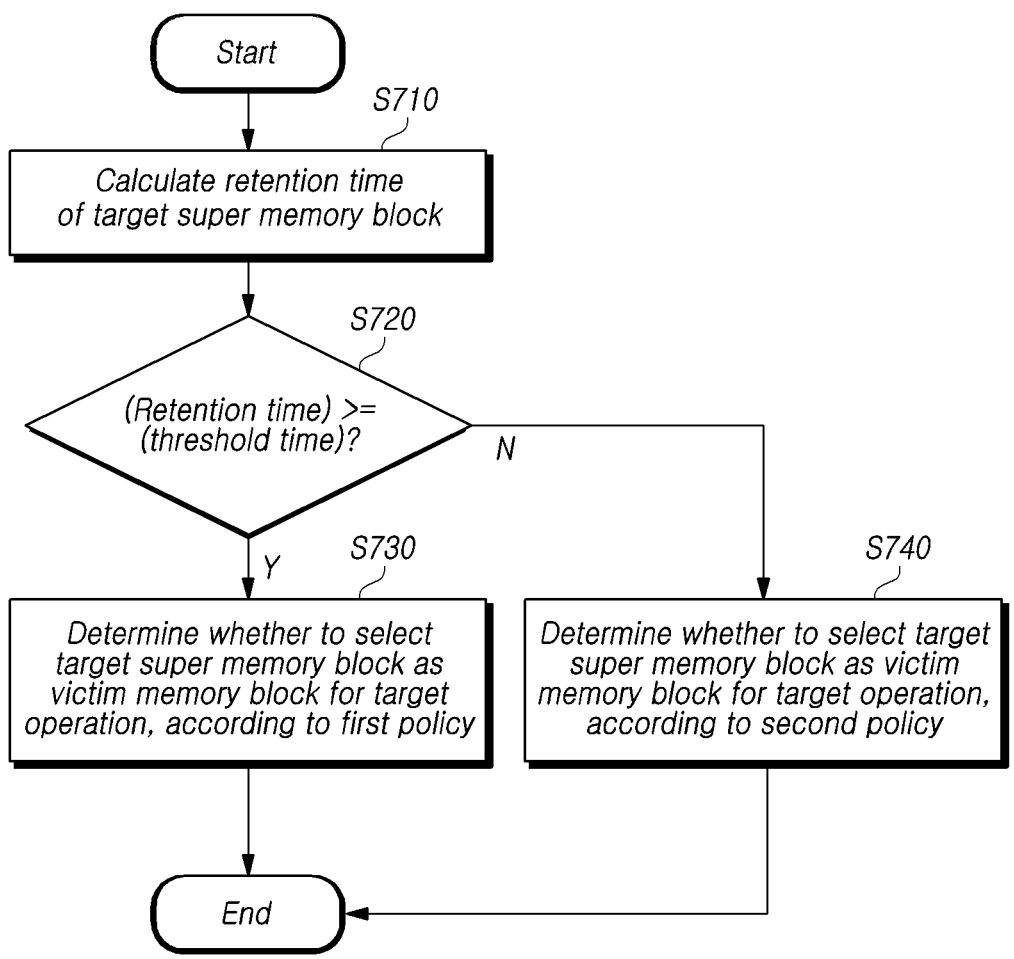
FIG. 7 is a flowchart illustrating an example of an operation of a storage device according to a retention time, according to an embodiment of the disclosure.

FIG. 7 is a flowchart illustrating an example of an operation of a storage device according to a retention time, according to an embodiment of the disclosure.

Referring to FIG. 7, a controller 120 of a storage device 100 may calculate a retention time of a target super memory block TGT_SBLK (S710). For example, the retention time of the target super memory block TGT_SBLK may be calculated according to the method described above with reference to FIG. 6.

The controller 120 determines whether the retention time of the target super memory block TGT_SBLK is equal to or longer than a set threshold time (S720).

When the retention time of the target super memory block TGT_SBLK is equal to or longer than the threshold time (S720-Y), the controller 120 may determine whether to select the target super memory block TGT_SBLK as a victim memory block for a target operation, according to a first policy (S730).

On the other hand, when the retention time of the target super memory block TGT_SBLK is shorter than the threshold time (S720-N), the controller 120 may determine whether to select the target super memory block TGT_SBLK as a victim memory block for a target operation, according to a second policy (S740).

In other words, according to the retention time of the target super memory block TGT_SBLK, different policies may be applied to determine whether to select the target super memory block TGT_SBLK as a victim memory block for a target operation.

FIG. 8 is a diagram illustrating an example of an operation in which a storage device determines a victim memory block of a target operation, according to an embodiment of the disclosure.

Referring to FIG. 8, in a first policy POLICY_1, when the rate of valid data stored in the target super memory block TGT_SBLK to the storage capacity of the target super memory block TGT_SBLK is equal to or less than a first rate RATE_1, the target super memory block TGT_SBLK may be selected as a victim memory block for a target operation, and when the rate is greater than the first rate RATE_1, the target super memory block TGT_SBLK may be excluded as a victim memory block for a target operation.

In a second policy POLICY_2, when the rate of valid data stored in the target super memory block TGT_SBLK to the storage capacity of the target super memory block TGT_SBLK is equal to or less than a second rate RATE_2, the target super memory block TGT_SBLK may be selected as a victim memory block for a target operation, and when the rate is greater than the second rate RATE_2, the target super memory block TGT_SBLK may be excluded as a victim memory block for a target operation.

The first rate RATE_1 is greater than the second rate RATE_2. When the retention time of the target super memory block TGT_SBLK is equal to or longer than the threshold time, the controller 120 may change a reference value used to determine whether the target super memory block TGT_SBLK is a victim memory block for a target operation, and the change may increase the possibility that the target super memory block TGT_SBLK is selected as a victim memory block for a target operation.

For example, it is assumed that the first rate RATE_1 is 90%, the second rate RATE_2 is 80% and the rate of valid data stored in the target super memory block TGT_SBLK to the storage capacity of the target super memory block TGT_SBLK is 85%. In this case, when the first policy POLICY_1 is applied, the target super memory block TGT_SBLK is selected as a victim memory block for a target operation, but when the second policy POLICY_2 is applied, the target super memory block TGT_SBLK is not selected as a victim memory block for a target operation.

As a result, the controller 120 may recover a free space for a super memory block in which data has been retained for a long time, that is, a super memory block which is in a cold state. Therefore, a frequency of subsequently executing additional garbage collection due to lack of a free space may decrease, and as a result, the write performance and lifetime of the storage device 100 may increase.

In the above-described embodiments of the disclosed technology, whether the target super memory block TGT_SBLK is selected as a victim memory block for a target operation may be determined when the target operation is triggered.

Hereinafter, an operation of changing a frequency of triggering a target operation by the storage device 100 will be described.

Figure 9:
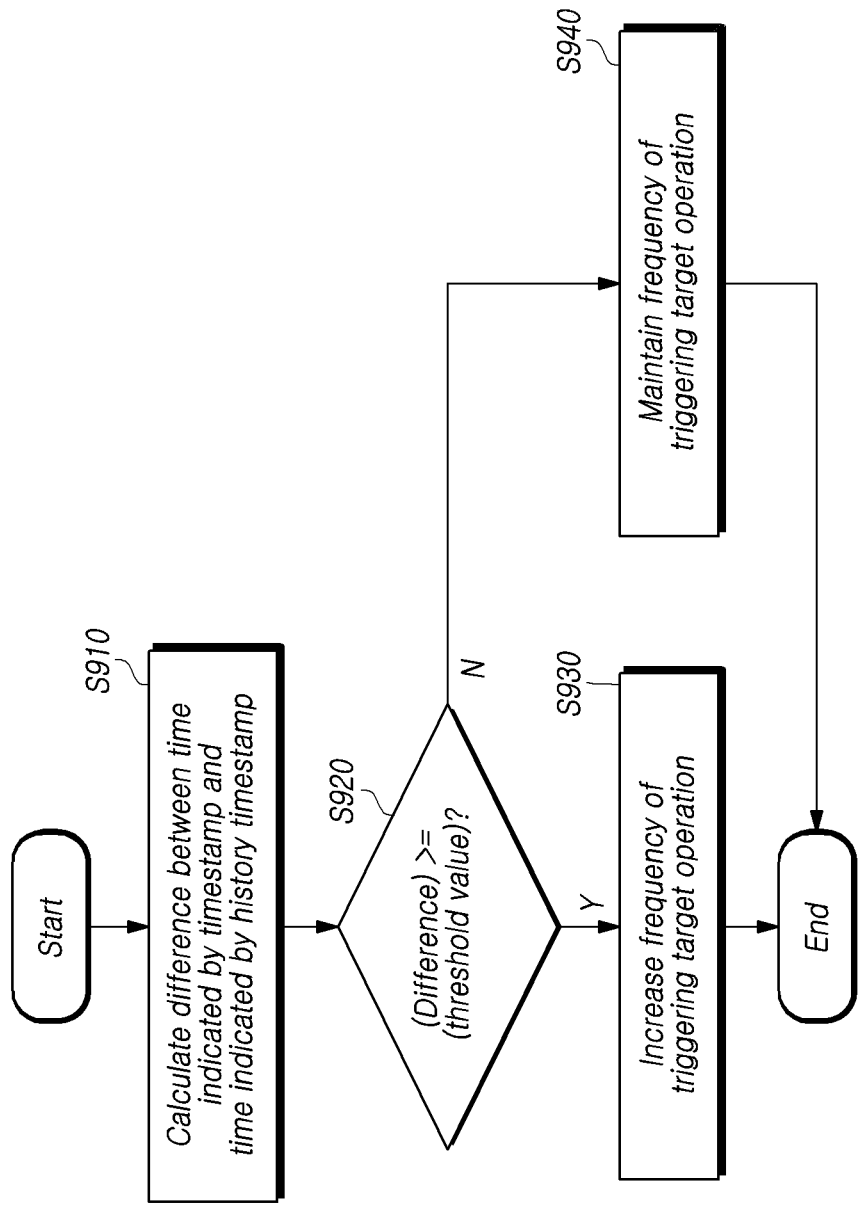
FIG. 9 is a diagram illustrating an example of an operation in which a storage device determines a frequency of triggering a target operation, according to an embodiment of the disclosure.

FIG. 9 is a diagram illustrating an example of an operation in which a storage device determines a frequency of triggering a target operation, according to an embodiment of the disclosure.

Referring to FIG. 9, a controller 120 of a storage device 100 may calculate a difference between a timestamp received from an external device and a history timestamp (S910). The history timestamp may be a timestamp received by the controller 120 from the external device when the storage device 100 is booted.

The controller 120 determines whether the difference calculated at the step S910 is equal to or greater than a set threshold value (S920).

When the difference calculated at the step S910 is equal to or greater than the set threshold value (S920-Y), the controller 120 may increase a frequency of triggering a target operation (S930). For example, the controller 120 may increase a frequency of checking for errors occurring in data stored in the memory 110, based on a high possibility that an error occurs in the data stored in the memory 110. Accordingly, a frequency at which an error is detected in the data stored in the memory 110 may increase, and a frequency at which the controller 120 triggers a target operation in order to solve such a situation may also increase.

On the other hand, when the difference calculated at the step S910 is less than the set threshold value (S920-N), the controller 120 may maintain a frequency of triggering a target operation (S940).

Figure 10:
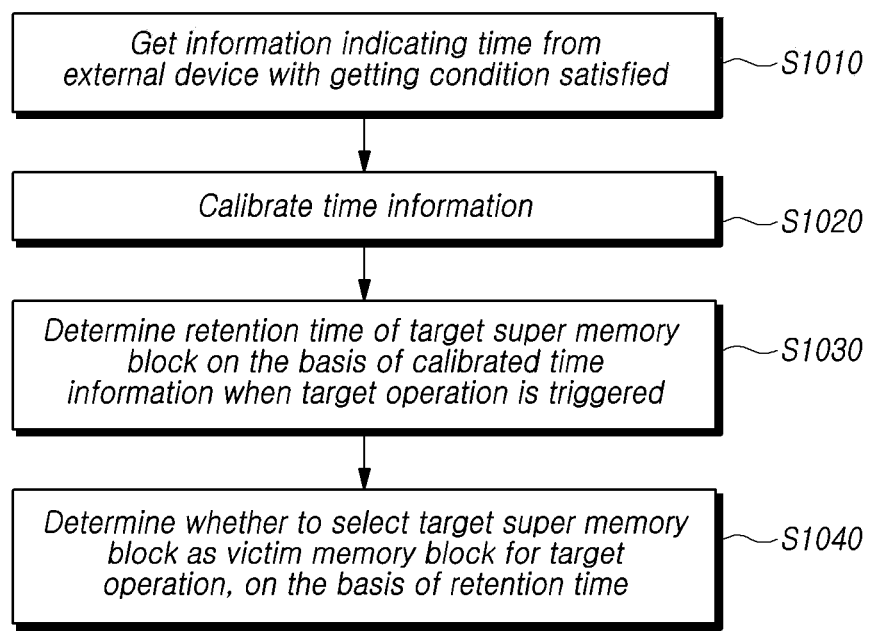
FIG. 10 is a diagram illustrating a method for operating a storage device according to an embodiment of the disclosure.

FIG. 10 is a diagram illustrating a method for operating a storage device according to an embodiment of the disclosure.

Referring to FIG. 10, a method for operating a storage device 100 may include getting information indicating a current time when condition for receiving current time is satisfied (S1010). A condition may be a condition for receiving a timestamp, and the information indicating a current time may be the timestamp.

For example, the getting condition may be satisfied when the storage device 100 is powered on or when the storage device 100 wakes up from a low power state.

The method for operating the storage device 100 may include calibrating time information on the basis of the information received at the step S1010 (S1020). The time information may be information indicating an internal time of the storage device 100.

The method for operating the storage device 100 may include determining the retention time of the target super memory block TGT_SBLK when a target operation is triggered by using the time information that is calibrated at the step S1020 (S1030). The target super memory block TGT_SBLK may include one or more of the plurality of memory blocks BLK.

The target operation may be garbage collection or wear leveling.

For example, the step S1030 may include determining a first time point; determining, as a second time point, a time point at which all or a part of data stored in the target super memory block TGT_SBLK is first written or a time point at which all or a part of data stored in the target super memory block TGT_SBLK is recently updated; and determining a difference between the first time point and the second time point as the retention time of the target super memory block TGT_SBLK.

The method for operating the storage device 100 may include determining whether to select the target super memory block TGT_SBLK as a victim memory block for a target operation based on the retention time of the target super memory block TGT_SBLK (S1040).

For example, the step S1040 may include determining a policy for selecting the target super memory block TGT_SBLK as a victim memory block for a target operation, according to whether the retention time of the target super memory block TGT_SBLK is equal to or longer than a set threshold time, and determining whether to select the target super memory block TGT_SBLK as a victim memory block for a target operation, on the basis of the determined policy.

When the retention time of the target super memory block TGT_SBLK is equal to or longer than the threshold time, the policy may be determined as a first policy, and when the retention time of the target super memory block TGT_SBLK is shorter than the threshold time, the policy may be determined as a second policy.

The first policy may be a policy in which the target super memory block TGT_SBLK is selected as a victim memory block for a target operation when the rate of valid data stored in the target super memory block TGT_SBLK to the storage capacity of the target super memory block TGT_SBLK is equal to or less than a first rate RATE_1.

The second policy may be a policy in which the target super memory block TGT_SBLK is selected as a victim memory block for a target operation when the rate of valid data stored in the target super memory block TGT_SBLK to the storage capacity of the target super memory block TGT_SBLK is equal to or less than a second rate RATE_2. The first rate RATE_1 is greater than the second rate RATE_2.

Although exemplary embodiments of the disclosure have been described for illustrative purposes, those skilled in the art will appreciate that various modifications, additions and substitutions are possible, without departing from the scope and spirit of the disclosure. Therefore, the embodiments disclosed above and in the accompanying drawings should be considered in a descriptive sense only and not for limiting the technological scope. The technological scope of the disclosure is not limited by the embodiments and the accompanying drawings. The spirit and scope of the disclosure should be interpreted in connection with the appended claims and encompass all equivalents falling within the scope of the appended claims.

What is claimed is:

1. A storage device comprising:
a memory including a plurality of memory blocks; and
a controller configured to:
receive a timestamp from an external device when a set timestamp getting condition is satisfied,
determine a retention time of a target super memory block including at least one among the plurality of memory blocks according to time information calibrated on the basis of the timestamp, when a set target operation is triggered, and
determine whether to select the target super memory block for the target operation on the basis of the retention time of the target super memory block,
wherein, when the retention time of the target super memory block is equal to or longer than a set threshold time, the controller uses a first policy to determine whether to select the target super memory block for the target operation,
wherein, in the first policy, the target super memory block is selected for the target operation when a rate of valid data stored in the target super memory block to a storage capacity of the target super memory block is equal to or less than a first reference rate,
wherein, when the retention time of the target super memory block is less than the set threshold time, the controller uses a second policy to determine whether to select the target super memory block for the target operation,
wherein, in the second policy, the target super memory block is selected for the target operation when a rate of valid data stored in the target super memory block to a storage capacity of the target super memory block is equal to or less than a second reference rate, and
wherein a value of the first reference rate is greater than the second reference rate.

2. The storage device according to claim 1, wherein the timestamp getting condition is satisfied when the storage device is powered on or when the storage device wakes up from a low power state.

3. The storage device according to claim 1, wherein the target operation is a garbage collection or wear leveling operation.

4. The storage device according to claim 1, wherein, when the target operation is garbage collection, the target operation is triggered when the storage device is in an idle state.

5. The storage device according to claim 1, wherein the controller determines a first time point, determines, as a second time point, a time point at which all or a part of data stored in the target super memory block is first written or a time point at which all or a part of data stored in the target super memory block is recently updated, and determines a difference between the first time point and the second time point, as the retention time of the target super memory block.

6. The storage device according to claim 1, wherein the controller increases a frequency of triggering the target operation, when a difference between a time indicated by the timestamp and a time indicated by a history timestamp, received from the external device when the storage device is booted, is equal to or greater than a set threshold value.

7. A method for operating a storage device, comprising:
getting information indicating a current time, in a state in which a set getting condition is satisfied;
calibrating time information on the basis of the information;
determining a retention time of a target super memory block including at least one among a plurality of memory blocks on the basis of the calibrated time information, when a target operation is triggered; and
determining whether to select the target super memory block for the target operation, on the basis of the retention time of the target super memory block by
applying a first policy to determine whether to select the target super memory block for the target operation when the retention time of the target super memory block is equal to or longer than a set threshold time, and
applying a second policy to determine whether to select the target super memory block for the target operation when the retention time of the target super memory block is less than the set threshold time,
wherein, in the first policy, the target super memory block is selected for the target operation when a rate of valid data stored in the target super memory block to a storage capacity of the target super memory block is equal to or less than a first reference rate,
wherein, in the second policy, the target super memory block is selected for the target operation when a rate of valid data stored in the target super memory block to a storage capacity of the target super memory block is equal to or less than a second reference rate, and
wherein a value of the first reference rate is greater than the second reference rate.

8. The method according to claim 7, wherein the getting condition is satisfied when the storage device is powered on or when the storage device wakes up from a low power state.

9. The method according to claim 7, wherein the target operation is a garbage collection or wear leveling operation.

10. The method according to claim 7, wherein the determining of the retention time of the target super memory block comprises:

determining a first time point;

determining, as a second time point, a time point at which all or a part of data stored in the target super memory block is first written or a time point at which all or a part of data stored in the target super memory block is recently updated; and determining a difference between the first time point and the second time point, as the retention time of the target super memory block.

11. A controller comprising:

a memory interface capable of communicating with a memory including a plurality of memory blocks; and a control circuit configured to calibrate time information on the basis of a timestamp received from an external device, to determine a retention time of a target super memory block including at least one among the plurality of memory blocks according to the calibrated time information, when a target operation is triggered, and to select the target super memory block for the target operation, according to the retention time of the target super memory block, wherein the control circuit determines whether to select the target super memory block for the target operation, according to a first policy, when the retention time of the target super memory block is equal to or longer than a set threshold time, and determines whether to select the target super memory block for the target operation, according to a second policy, when the retention time of the target super memory block is shorter than the set threshold time, wherein, in the first policy, the target super memory block is selected for the target operation when a rate of valid data stored in the target super memory block to a storage capacity of the target super memory block is equal to or less than a first reference rate, wherein, in the second policy, the target super memory block is selected for the target operation when a rate of valid data stored in the target super memory block to a storage capacity of the target super memory block is equal to or less than a second reference rate, and wherein a value of the first reference rate is greater than the second reference rate.

12. The storage device according to claim 1, wherein, in the first policy, the target super memory block is not selected for the target operation when a rate of valid data stored in the target super memory block to a storage capacity of the target super memory block is greater than the first reference rate, wherein, in the second policy, the target super memory block is not selected for the target operation when a rate of valid data stored in the target super memory block to a storage capacity of the target super memory block is greater than the second reference rate.

13. The method according to claim 7, wherein, in the first policy, the target super memory block is not selected for the target operation when a rate of valid data stored in the target super memory block to a storage capacity of the target super memory block is greater than the first reference rate, wherein, in the second policy, the target super memory block is not selected for the target operation when a rate of valid data stored in the target super memory block to a storage capacity of the target super memory block is greater than the second reference rate.

14. The controller according to claim 11, wherein, in the first policy, the target super memory block is not selected for the target operation when a rate of valid data stored in the target super memory block to a storage capacity of the target super memory block is greater than the first reference rate, wherein, in the second policy, the target super memory block is not selected for the target operation when a rate of valid data stored in the target super memory block to a storage capacity of the target super memory block is greater than the second reference rate.

* * * * *